United States Patent [19]

Skobic et al.

[11] Patent Number: 4,962,700

[45] Date of Patent: Oct. 16, 1990

[54] APPARATUS FOR THE CONTINUOUS STERILIZATION OF FOODSTUFFS ARRANGED IN PARTICULAR IN CONTAINERS

[75] Inventors: Davor Skobic; Ivo Kolin, both of Zagreb, Yugoslavia

[73] Assignee: Sour "Gavrilovic", Petrinja, Yugoslavia

[21] Appl. No.: 366,690

[22] Filed: Jun. 15, 1989

[30] Foreign Application Priority Data

Jul. 1, 1988 [YU] Yugoslavia .................................. 1283

[51] Int. Cl.⁵ .............................. A23L 3/00; A23L 3/04
[52] U.S. Cl. ...................................... 99/470; 99/355; 99/361; 99/477; 99/483
[58] Field of Search ................ 99/330, 354–360, 99/361–371, 403, 404, 409, 477, 483, 478, 443 C, 516, 534, 536, 467–470, 474, 476; 426/232, 523, 407, 412; 422/25, 302, 304, 297

[56] References Cited

U.S. PATENT DOCUMENTS

| | | | |
|---|---|---|---|
| 4,059,046 | 11/1977 | Yamazaki et al. | 99/472 |
| 4,092,111 | 5/1978 | Gaignoux et al. | 99/359 |
| 4,164,590 | 8/1979 | Mencacci | 426/407 |
| 4,169,408 | 10/1979 | Mencacci | 99/367 |
| 4,179,986 | 12/1979 | Mencacci | 99/359 |
| 4,523,520 | 6/1985 | Hofmann et al. | 99/443 C |
| 4,646,629 | 3/1987 | Creed et al. | 99/483 |
| 4,661,325 | 4/1987 | Noro et al. | 422/304 |
| 4,702,161 | 10/1987 | Anderson | 99/470 |
| 4,773,321 | 9/1988 | Wijts | 99/468 |

*Primary Examiner*—Timothy F. Simone
*Attorney, Agent, or Firm*—Dvorak and Traub

[57] ABSTRACT

The invention relates to an apparatus for the continuous sterilization of foodstuffs arranged in particular in containers, comprising chambers for heating, sterilization and cooling, with introduction of steam or water vapor into at least one of said chambers and is distinguished in that the chambers equipped with endlessly revolving conveyors are separated from each other by separating doors (4) which are each made closable by electric motors (5) and reduction gearing (6), the first preliminary chamber (1) being configured for the preparation, the second chamber (2) for heating up and sterilization in warm water under pressure with heating by means of steam, and the third chamber (3) for cooling in cold water under said pressure and that elevatedly disposed hydrostatic chambers (8; 12) are arranged to ensure a permanently maintained operating pressure.

10 Claims, 1 Drawing Sheet

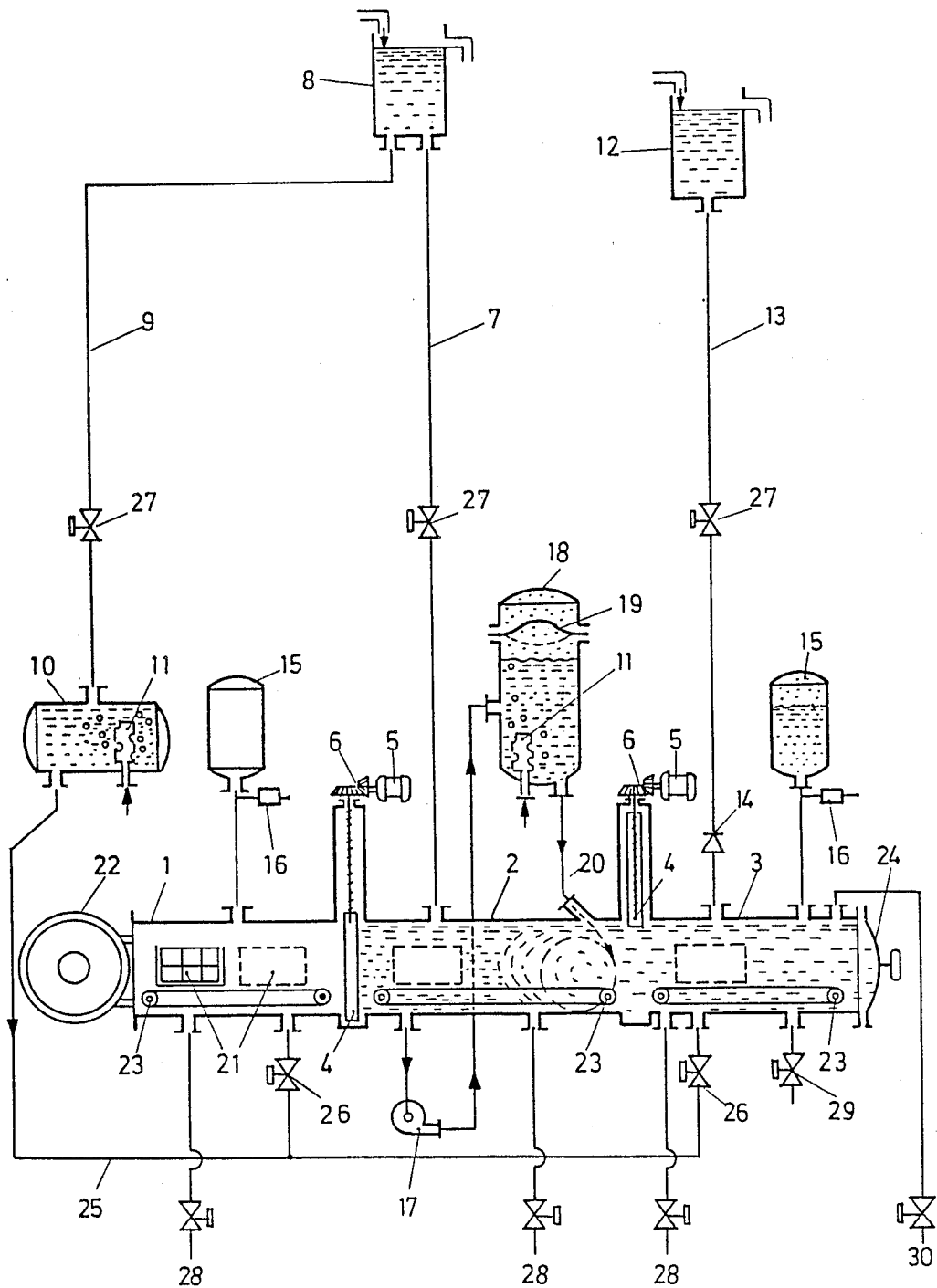

APPARATUS FOR THE CONTINUOUS STERILIZATION OF FOODSTUFFS ARRANGED IN PARTICULAR IN CONTAINERS

BACKGROUND OF THE INVENTION

1. Field of the Invention

The invention relates to an apparatus for the continuous sterilization of foodstuffs disposed in containers of horizontal construction, having chambers for heating, sterilizing and cooling, the chambers being separated from each other by separating doors movable up and down.

2. Description of the Related Art

Such an apparatus is known from CH-PS 406,810 which although also of the horizontally constructed type a transport of cans through the apparatus is not possible, a pressure compensation is not present, since water jet transport is used and therein the same water must always be employed and a construction referred to therein as pressure compensation cannot fulfill its purpose. Also, in this known case a vacuum is employed and the sterilizing medium would be sucked out on implementation. Thus, if this known apparatus were implemented it would in any case only be suitable for sterilizing containers of thin aluminium sheet or plastic sheet.

In a known apparatus of vertical construction (DE-AS 1,617,987) the corresponding steam pressure is obtained in separate columns by hydrostatic water pressure and the operation is carried out several times. However, water and water vapour or steam have different heat transfer coefficients. This reduces the reliability of the apparatus and is more complicated from the technical point of view. Moreover, when the foodstuffs pass through vertical columns the pressure is continuously varied in complete dependence upon the water column height.

SUMMARY OF THE INVENTION

Compared therewith, the invention is based on the problem of further developing an apparatus of the type mentioned at the beginning in such a manner that a more uniform product is obtained and sterilization directly with steam as well as pressure level fluctuations are avoided.

This is surprisingly achieved according to the invention by ensuring a constant operating pressure to be permanently maintained by elevatedly arranged hydrostatic chambers and carrying out the sterilizing heating solely in hot water under pressure.

In the horizontal apparatus according to the invention the foodstuffs in their containers are always in water and always under the same pressure which is set constant with the aid of the hydrostatic vessels. The heat transfer medium is thus always only water and this leads to a uniform heat transfer in the course of the sterilization process.

In order to destroy microorganisms, for example Clostridium Botulinum, in the sterilization, i.e. to destroy pronounced "foodstuff poisons", the foodstuffs are subjected to the heating at a water temperature up to 120° C. which corresponds to a pressure of about 2 bar.

If on the other hand the can does not cool down sufficiently after sterilization it can deform, open or break, if pressure fluctuations occur. This frequently happens in sterilizing apparatuses, in particular in the transitional phase from the heating to the cooling, and it is very difficult to regulate the constant pressure.

With this step according to the invention on the one hand these fluctuations are avoided and on the other pressure changes during the process because the elevatedly arranged hydrostatic vessels always maintain the same pressure in the continuously operating horizontal apparatus.

Compared with this prior art the apparatus according to the invention requires substantially less water and two relatively thin tubes supply the constant pressure (2 bar) with the aid of the correspondingly (20 m) elevated hydrostatic vessels. Only horizontal transport belts and then only of very short design are necessary. Their energy consumption is low. They are in operation only for a short time when the foodstuff charges are transferred from the one chamber to the other. There is always only one heat transfer medium present, i.e. water, and consequently only one and the same heat transfer coefficient is involved; the technological process is balanced and the execution simplified.

The step according to the invention avoids any waiting time because the continuous method can be carried out more rapidly since all three phases, i.e. preparation, sterilization and cooling, can take place simultaneously in three chambers arranged in series. Furthermore, vessels with foodstuffs which are already hermetically sealed enter the horizontal apparatus according to the invention so that no additional danger of contamination is caused. Moreover, the linear transport is considerably simpler compared with the spiral plate of limited capacity rotating alternately firstly in the filling direction and then in the emptying direction.

BRIEF DESCRIPTION OF THE DRAWINGS

An example of embodiment of the invention clearly illustrating the principle thereof will now be explained in detail with reference to the attached drawing. The latter represents a vertical section through an embodiment of the horizontal apparatus for continuous foodstuff sterilization.

DESCRIPTION OF THE PREFERRED EMBODIMENT

In the continuous sterilizing process taking place continuously in chambers 1, 2 and 3 there are simultaneously three different foodstuff batches, the first of which is in the preparatory phase, the second in the sterilizing phase and the third in the cooling phase. All three phases will be described separately below.

The heating-up chamber 2 is first to be brought to operating temperature and this is done as follows: firstly, with the aid of electric motors 5 with reduction gearings 6 the two separating doors 4 are lowered; thereafter the chamber 2 is filled with water from the hydrostatic vessel 8 via a conduit 7 and by opening the valve 27. Due to the hydrostatic pressure at the same time the heating-up main vessel 18 is filled in which a small amount of air remains for pressure concentration beneath the for example flexible diaphragm spring.

The hydrostatic pressure, caused by the action of the elevatedly arranged vessel 8, closes both doors 4 hermetically. The circulation pump 17 is now activated; boiler steam is supplied through the hot steam nozzle 11 so that water is introduced via the tube 20 tangentially into the chamber 2. The desired temperature is obtained with the aid of the usual automatic temperature control which regulates the steam supply via the nozzle 11. No water evaporation can take place because the hydrostatic vessel 8 holds the operating pressure at saturation temperature at the boundary. To destroy the microorganisms with the sterilization, for example Clostridium Botulinum, the foodstuffs are subjected to a heating at water temperatures up to 120° C., corresponding to a pressure of 2 bar.

The preliminary chamber 1 is filled after the receiving chamber 2 has been brought to operating temperature (sterilization temperature). The preliminary chamber 1 is filled with the prepared foodstuff batch 21 by means of an endless horizontal conveyor 23 arranged in said chamber and the inlet door 22 closed. The air remaining in said preliminary chamber is gradually displaced upwardly by means of water and let out via the vent valve 16. The water flowing into the preliminary chamber 1 should be warm so that later on opening the separating door 4 the temperature difference between the two chambers is lower. This hot water comes from the auxiliary heating vessel 10 which is heated by means of the steam nozzle 11. The heating of the vessel 18 and of the vessel 10 is carried out with steam or vapour branched from one and the same conduit. For protection against hydraulic surges the equalization vessel 15 is provided which is likewise filled with water and serves to balance the pressure in the chambers 1 and 2; the remaining air cushion eliminates the hydraulic shock towards the end of the filling operation. Everything is now ready for transfer of the foodstuff batch 21 to the next phase, the sterilization phase in the chamber 2.

The first transfer of the foodstuff batch to the sterilization phase is carried out after pressure compensation in the chambers 1 and 2 has been carried out in a manner similar to that adopted in a submarine. If the first separating door 4 is opened by means of an electric motor 5 with reduction gearing 6 the foodstuffs 21 are transported by the two conveyors 23 out of the preliminary chamber 1 into the heating chamber 2. After said transfer of the foodstuff batch 21 the first separating door 4 is closed and thereafter the water drained from the preliminary chamber 1 by means of the valve 28, the inlet valve 26 being however previously closed. During the discharge the vent valve 16 communicates with the ambient air and facilitates the water discharge from the chamber 1. When the entire amount of water has been discharged the inlet door 22 can be opened again for recharging with a further foodstuff batch.

The foodstuff sterilization is now carried out in the heating chamber 2; the necessary temperature is obtained by means of the steam nozzle 11 and the circulating pump 17.

The resulting air cushions together with the action of the flexible spring, for example diaphragm, eliminate all pressure fluctuations which arise due to the thermodynamic expansion process, the condensation and the mixing when the steam at elevated temperature and pressure bubbles directly from the nozzle 11 into the water at lower temperature and pressure. Meanwhile a constant pressure is obtained due to the elevatedly arranged hydrostatic vessel during the entire process. The height difference between the arrangement of the two hydrostatic vessels 8 and 12 is about 1 m in favour of the vessel 8.

The filling of the chamber 3 with water takes place after the necessary sterilization time in the heating chamber 2 has passed, the preliminary chamber 1 being filled earlier than this with foodstuffs and warm water. To obtain hot water in the chamber 2 the chamber 3 is first filled with hot water from the auxiliary heating vessel 10 via the tube 25 and inlet valve 26. The hot water filling or the pressure equalizations in the chambers 1 and 3 can be carried out during the continuously operating process.

The second transfer of the canned foodstuffs takes place after pressure equalization in all three chambers. The two separating doors 4 open simultaneously by means of the electric motor 5 with reduction gearing 6. The same horizontal endless conveyors as in the chamber 1 are also present in the chambers 2 and 3. If both doors 4 are open all three conveyors 23 are activated and the already prepared foodstuff batch 21 leaves the preliminary chamber 1 and enters the heating chamber 2, the already sterilized batch passes from the heating chamber 2 to the cooling chamber 3. Once the transfer of the foodstuffs is completed the two separating doors 4 are closed. The second compensation vessel 15 with vent valve 16 plays the same part as the equalizing or balancing vessel 15 in filling the preliminary chamber 1.

The cooling of the foodstuff batch under pressure in the chamber 3 starts with opening of the inlet valve for cold water 29 which passes through the check valve 14 and the valve 27, the inlet valve 26 then firstly being closed. The cooling water flows further via the tube 13 into the second hydrostatic vessel 12 which is arranged somewhat lower, for example 1 m, than the hydrostatic vessel 8.

In this manner a quite small pressure difference is achieved between the chambers 3 and 2 and the sealing at the second separating door 4 ensured. This also avoids mixing of the hot water for sterilizing with the cooling water which could otherwise occur if the second door 4 were not hermetically sealed. Cold water now further enters under pressure as ensured by the hydrostatic vessel 12. A bulging of the foodstuff vessels, which are still hot and under pressure, is prevented. An overflow may be provided at the pressure vessel 12.

If the temperature in the foodstuff vessels is gradually lowered the internal pressure is thereby also gradually reduced; the cooling can be continued with the aid of the flow cooling water without the other hydrostatic vessel 12. For this purpose the outlet valve 30 is opened after first closing the valve 27.

The sterilized foodstuffs are discharged when the necessary cooling time has expired. The inlet cooling water valve 29 then closes; the outlet valve 28 leading to the cooling chamber 3 opens. The water discharge from the chamber 3 corresponds to the water discharge from the preliminary chamber 1; the vent valve 16 of the other compensating vessel 15 then communicates with the ambient air and thus facilitates the water discharge. Once the water has been completely drained from the chamber 3 the discharge door 24 can be opened; with the aid of the conveyor 23 the cooled foodstuff batch is discharged.

The continuous sterilization process is repeated in the manner described in the sequence indicated. On interrupting operation of the entire apparatus all the valves 27 close; the apparatus can then be completely emptied by opening all the outlet valves 28.

The same apparatus can of course also be used for pasteurization, in which case lower operating temperatures and pressures are to be employed.

It should also be mentioned that the water in the course of the continuous process in all three chambers is continuously exchanged. In this manner the sterilization process is not endangered by using the same water which could be contaminated in the event of a leak of any of the foodstuff vessels or in some other way.

With the step according to the invention pressure changes during the process are avoided by the elevated (up to 20 m) hydrostatic vessels which always maintain the same pressure in the continuous horizontal apparatus. Thus, only three chambers with endlessly revolving conveyors separated from each other by separating doors are required, the first of which serves for preparation, the second for sterilization in hot water under pressure - water heated by steam - and the third for cooling in cold water under pressure, the operating pressure being continuously maintained by the hydrostatic chambers arranged in elevated positions.

In the process according to the invention in which the canned or bottled foodstuff batch passes through three consecutive horizontal regions, the operating pressure (of the water) is held in accordance with the vapour pressure curve by the continuously acting constant hydrostatic pressure in the ranges corresponding to the vapour pressure curve, which at a pressure of 2 bar corresponds substantially to a temperature of 120° C. All three phases, i.e. preparation, heating and cooling, take place simultaneously.

What is claimed is:

1. Apparatus for the continuous sterilization of foodstuff batches, comprising a container horizontally disposed, said container having a preliminary chamber, an adjoining heat chamber communicating with sterilizing and cooling chambers, the chambers being separated from each other by separating doors movable up and down, and elevatedly arranged upper and lower hydrostatic chambers coupled to said preliminary, heat sterilizing and cooling chambers for controlling a constant operating pressure for carrying out sterilizing heating solely in hot water under pressure, wherein the heating chamber is connected via a conduit to the upper hydrostatic chamber for elevated hydrostatic pressure which in turn is connected via a conduit to an auxiliary heating vessel which is heated by means of a steam nozzle.

2. Apparatus according to claim 1, characterized in that the separating doors are each made closable by electric motors with reduction gearings.

3. Apparatus according to claim 1, characterized in that the cooling chamber is connected to said lower hydrostatic chamber via a tube provided with a check valve.

4. Apparatus according to claim 3, characterized in that the preliminary chamber and the cooling chambers are each provided with a pressure-compensation vessel having vent valves.

5. Apparatus according to claim 4, characterized in that the heating chamber communicates via a circulating pump with the heating chamber which is provided with a flexible diaphragm spring and is heatable via a steam nozzle in such a manner that hot water enters via an inlet connecting a tube piece tangentially into the sterilization chamber.

6. Apparatus according to claim 1, characterized in that the path of the foodstuff charge passes through a door on a conveyor into the heating chamber and the cooling chamber and leaves the apparatus via an end-side exit door.

7. Apparatus according to claim 1, characterized int hat the path of the hot water runs from the auxiliary heating vessel with communication via a tube and inlet valves into the chambers.

8. Apparatus according to claim 1, characterized in that all the chambers are equipped with valves and discharge valves.

9. Apparatus according to claim 1, characterized in that the cooling chamber is provided with an inlet valve for the cooling water and a discharge valve.

10. Apparatus according to claim 1, characterized in that the hydrostatic chambers are arranged about 20 m above the preliminary, heat and cooling chambers arranged horizontally in series and the lower hydrostatic chamber acting on the cooling chamber is arranged more particularly 1 m lower than the upper hydrostatic chamber acting on the preliminary and cooling chambers.

* * * * *